Patented Mar. 6, 1928.

1,661,203

UNITED STATES PATENT OFFICE.

CARLO TONIOLO, OF MILAN, ITALY.

PROCESS FOR THE RAPID EVAPORATION TO DRYNESS OF AMMONIUM-NITRATE SOLUTIONS.

No Drawing. Application filed January 27, 1926, Serial No. 84,251, and in Italy February 7, 1925.

It is well known that water solutions of ammonium nitrate cannot be rapidly evaporated to dryness without entailing a decomposition of the salt and therewith a loss of nitrogen and corrosion of the apparatus in which the operations are carried out.

Such decompositions are due to the high boiling temperatures of highly concentrated ammonuim nitrate solution. They occur more readily with temperatures above 140°, but they take place even at lower temperatures in the presence of substances which, like the iron of the apparatus, are liable to react with $HNO_3$.

The subject matter of the present invention is a process for a very quick and almost instantaneous evaporation of ammonium nitrate solutions which in advance have been concentrated only as far as was practicable without using such temperatures as would involve a decomposition of the salt.

The process consists in pouring or spraying the highly concentrated water solution (which may also be considered as a mass of ammonium nitrate dissolved in a small amount of water) on a mass of dry pulverized ammonuim nitrate with which it can be rapidly incorporated, under the simultaneous action of more or less dry air or gas.

It is very important that the incorporation of the liquid and solid masses and the action of the air current be simultaneous.

The dry salt and the air current may be cold or warm; the latter is indispensable whenever the concentration of the solution has not been carried so far as to reduce the water content to an amount small enough to be evaporated by the latent heat that is spontaneously set free during the solidification of the dissolved salt, this heat being thus advantageously utilized.

Processes are already known for quickly evaporating ammonium nitrate solutions by spraying into a current of cold or hot air. In such cases, however, in order that a dry salt may be obtained, the concentration of the solution prior to the spraying must be carried as far as 94–95% and must accordingly be heated up to such high temperature as have been found detrimental.

Should only 90–85% solutions be used, the salt, on being sprayed into the air current, would concentrate only partially and the remainder would deposit itself as a liquid mass, or as a liquefied mass in superfusion conditions but not yet dried conditions. In this superfusion condition it would remain for some time and finally settle into solid compact lumps which, though heated by the latent heat now set free, yet admit only of a less complete drying; finally the salt thus obtained forms incrustations on the walls of the apparatus and builds hard lumps.

With the process according to the present invention, instead, the superfusion, incomplete evaporation and forming of lumps are completely obviated.

Other processes are already known in which the highly concentrated ammonium nitrate solution is dried by incorporating it with other pulverized substances with which it is more or less capable to react so as to form other compounds or mixed salts. These processes are however different from the process according to the present patent application essentially as well as in their form. They differ essentially inasmuch as they aim at the obtention of mixed products and consequently they certainly imply the intervention of the positive or negative heats of the physical or chemical reactions of the said substances with the ammonium nitrate and water. All this is not contemplated nor can it intervene in our case.

The said processes also differ in their form, because they do not contemplate the concomitant action of a more or less hot current of air (or gas). Without such an action the said processes cannot have any practical value whenever the large masses that are coming into question in the industrial practice are to be dealt with, because if the evaporation does not take place quickly, lumps are formed which end by being cooled down ere the greatest portion of their water has been evaporated.

Example No. 1.

100 kilos ammonium nitrate with 90% concentration, heated to 90°–100° C., are slowly poured over 50 kilos dry, pulverized nitrate possessing a 70°–80° C. temperature, while the mass is being rapidly stirred and at the same time a strong air current is forced through the salt, the latter being converted into a dry product without any further ado. If it were desired to evaporate by ebullition a 90% ammonium nitrate solution, the latter would have to be initially heated to 145° C., which temperature would rise till about 200° C. according as the concentration is progressing if no decompositions were taking place.

*Example No. 2.*

100 kilos ammonium nitrate with 90°–100° C. temperature and 80% concentration are sprayed into the air current having about 100° C. temperature and carrying along with it 200 kilos pulverized ammonium nitrate likewise heated to about 100° C.

The sprayed product adheres to the pulverized nitrate and is dried up at once without depositing itself in superfusion conditions and without requiring the 125° and 200° C. temperatures that would be required if the solutions were to be boiled till a dry product is obtained.

Having now particularly described and ascertained the nature of my said invention and in what manner the same is to be performed, I declare that what I claim is:—

1. The process of preparing dry ammonium nitrate which comprises incorporating a hot concentrated ammonium nitrate solution with a mass of dry ammonium nitrate while blowing air through said dry nitrate.

2. The process of preparing dry ammonium nitrate which comprises incorporating a heated concentrated ammonium nitrate solution with a mass of heated dry ammonium nitrate while blowing air through said dry nitrate.

3. The process of preparing dry ammonium nitrate which comprises incorporating an ammonium nitrate solution having a concentration of about 80 to 90 per cent with a dry mass of dry ammonium nitrate having a temperature of about 70 to 100° C. while blowing air through said dry nitrate.

4. The process of preparing dry ammonium nitrate which comprises mixing an ammonium nitrate solution having a concentration of about 80 to 90 per cent and a temperature of 90 to 100° C. with a mass of dry ammonium nitrate having a temperature of about 70 to 100° C. while blowing air through said dry nitrate.

Signed at Milan (Italy), this 13th day of January 1926.

CARLO TONIOLO.